(12) United States Patent
Schelter et al.

(10) Patent No.: US 10,934,438 B2
(45) Date of Patent: Mar. 2, 2021

(54) COATINGS AND METHODS FOR USING AND PRODUCING THE SAME

(71) Applicants: AXALTA COATING SYSTEMS IP CO., LLC, Wilmington, DE (US); The Trustees of the University of Pennsylvania, Philadelphia, PA (US)

(72) Inventors: Eric J. Schelter, Philadelphia, PA (US); Alexander V. Zabula, Philadelphia, PA (US); Robert C. Nahas, Voorhees, NJ (US); Jerome R. Robinson, Providence, RI (US); Eric C. Houze, Philadelphia, PA (US); Gaurang Bhargava, Philadelphia, PA (US); Michael Kerins, Jr., Philadelphia, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 386 days.

(21) Appl. No.: 15/960,204

(22) Filed: Apr. 23, 2018

(65) Prior Publication Data
US 2018/0312701 A1    Nov. 1, 2018

Related U.S. Application Data

(60) Provisional application No. 62/490,727, filed on Apr. 27, 2017.

(51) Int. Cl.
| | | |
|---|---|---|
| C09D 5/08 | (2006.01) | |
| C09D 163/00 | (2006.01) | |
| C09D 167/00 | (2006.01) | |
| C09D 175/06 | (2006.01) | |
| C08L 75/04 | (2006.01) | |
| C08K 3/08 | (2006.01) | |
| C08K 5/09 | (2006.01) | |
| C08G 18/79 | (2006.01) | |
| C08G 18/42 | (2006.01) | |
| C08K 3/30 | (2006.01) | |

(52) U.S. Cl.
CPC ............ *C09D 5/08* (2013.01); *C08G 18/4202* (2013.01); *C08G 18/792* (2013.01); *C08L 75/04* (2013.01); *C09D 5/084* (2013.01); *C09D 163/00* (2013.01); *C09D 167/00* (2013.01); *C09D 175/06* (2013.01); *C08K 3/08* (2013.01); *C08K 5/09* (2013.01); *C08K 2003/3045* (2013.01); *C08K 2201/014* (2013.01)

(58) Field of Classification Search
CPC ........ C09D 5/08; C09D 5/084; C09D 163/00; C09D 167/00; C09D 175/06; C08G 18/4202; C08G 18/792; C08L 75/04; C08K 3/08; C08K 5/09; C08K 2003/3045; C08K 2201/014
USPC ......................................................... 524/396
See application file for complete search history.

(56) References Cited

U.S. PATENT DOCUMENTS 5,070,072 A * 12/1991 Mir ...................... H01L 39/2425
505/236
2010/0167088 A1* 7/2010 Chouai ................ C08G 59/184
428/702

* cited by examiner

*Primary Examiner* — Kelechi C Egwim
(74) *Attorney, Agent, or Firm* — Lorenz & Kopf, LLP

(57) ABSTRACT

Coatings and methods of using and producing the same are provided. In an exemplary embodiment, a coating includes a first ligand and a second ligand different than the first ligand. The first ligand includes a first carboxylic moiety, a first aromatic moiety, and a first linking moiety connecting the first carboxylic moiety to the first aromatic moiety. the first linking moiety includes an alkene. The second ligand includes a second carboxylic moiety. The coating includes a metal that is a lanthanoid metal, and the coating includes a coating resin.

20 Claims, 3 Drawing Sheets

US 10,934,438 B2

COATINGS AND METHODS FOR USING AND PRODUCING THE SAME

CROSS-REFERENCE TO RELATED APPLICATIONS

This application claims the benefit of U.S. Provisional Application No. 62/490,727, filed Apr. 27, 2017.

TECHNICAL FIELD

The technical field generally relates to corrosion resistant coatings and methods for reducing corrosion of metals, and more particularly relates to coating additives for inhibiting oxidation of metallic surfaces, and methods of using and producing the same.

BACKGROUND

Corrosion costs vast sums annually, including costs for repair of corroded articles and corrosion prevention actions. A prime example of corrosion is rusting metal objects, such as bridges, boats, automobiles, fencing, and a wide variety of other metallic articles. Coatings are commonly used to reduce corrosion, but many metals corrode despite the use of corrosion inhibiting coatings. Some coatings include anti-corrosion additives, such as chromate pigments and solutions, but these anti-corrosion additives can be toxic and present environmental issues.

Accordingly, it is desirable to provide coatings with anti-corrosion additives that provide superior anti-corrosion properties compared to traditional anti-corrosion additives. In addition, it is desirable to provide coatings with anti-corrosion additives that are less toxic than traditional anti-corrosive additives such as chromate pigments and solutions. Furthermore, other desirable features and characteristics of the present embodiment will become apparent from the subsequent detailed description and the appended claims, taken in conjunction with the accompanying drawings and this background of the invention.

BRIEF SUMMARY

Coatings and methods of using and producing the same are provided. In an exemplary embodiment, a coating includes a first ligand and a second ligand that is different than the first ligand. The first ligand includes a first carboxylic moiety, a first aromatic moiety, and a first linking moiety connecting the first carboxylic moiety to the first aromatic moiety. The first linking moiety includes an alkene. The second ligand includes a second carboxylic moiety. The coating includes a metal that is a lanthanoid metal, and the coating includes a coating resin.

A method of producing a coating is provided in another embodiment. The method includes combining different components. The components include a first ligand that includes a first carboxylic moiety, a first aromatic moiety, and a first linking moiety connecting the first carboxylic moiety to the first aromatic moiety. The first linking moiety includes an alkene. Another component is a second ligand different than the first ligand, where the second ligand includes a second carboxylic moiety. The components also include a lanthanoid metal and a coating resin. The components are mixed to produce the coating.

A method of using a coating is provided in yet another embodiment. The method includes applying a coating over an article, where the coating includes a first ligand, a second ligand different than the first ligand, a lanthanoid metal, and a coating resin. The first ligand includes a first carboxylic moiety, a first aromatic moiety, and a first linking moiety connecting the first carboxylic moiety to the first aromatic moiety. The first linking moiety includes an alkene, and the second ligand includes a carboxylic moiety. The coating is then cured.

BRIEF DESCRIPTION OF THE DRAWINGS

The present embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
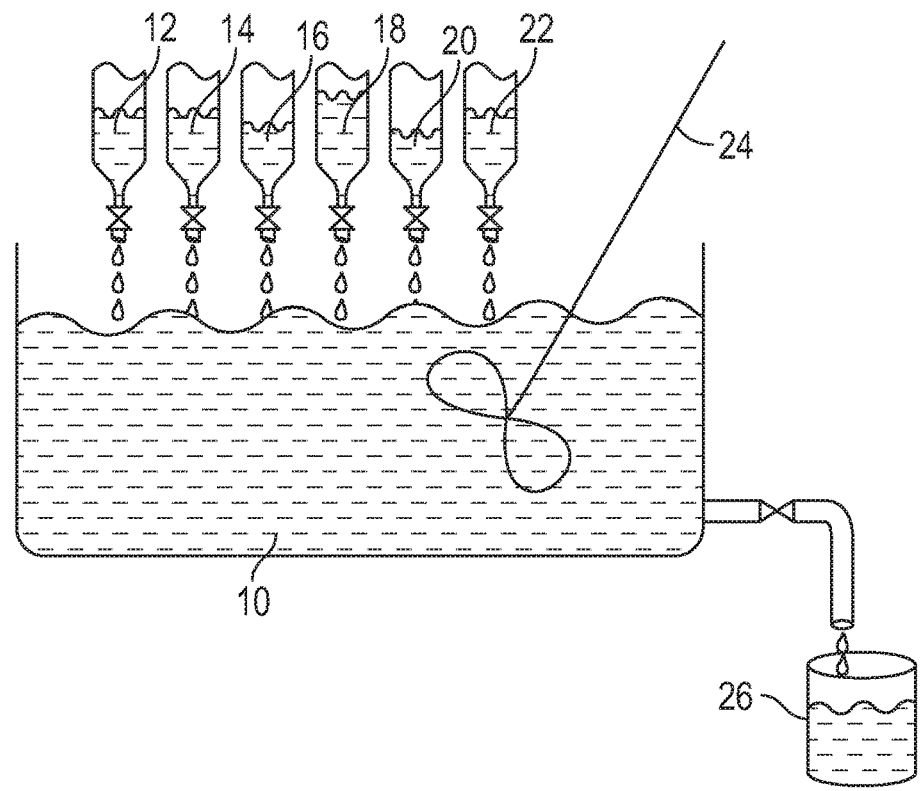
FIG. 1 is a schematic view of an embodiment of a coating and a method of making the same.

Reference is made to FIG. 1. A variety of components are combined to produce a coating 10. The components are mixed and then packaged in an exemplary embodiment. The components of the coating 10 include a first ligand 12, a second ligand 14, a lanthanoid metal 16, a coating resin 18, and a solvent 20. The coating 10 also optionally includes one or more additives 22. A mixer 24 is used to mix the various components in an exemplary embodiment, and the coating 10 is packaged in a container 26.

Figure 2:
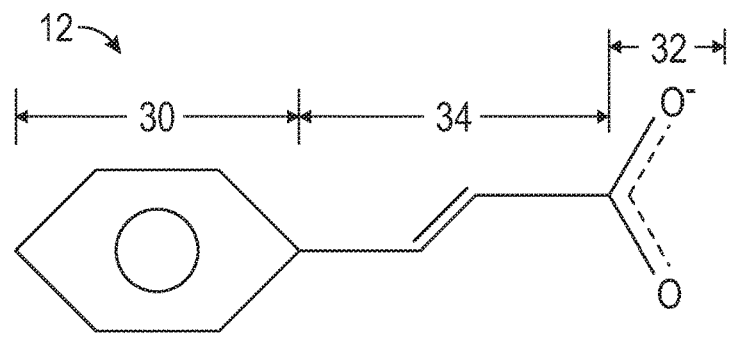
FIGS. 2 and 3 illustrate embodiments of chemical structures for selected compounds.

An embodiment of the first ligand 12 is illustrated in FIG. 2, with continuing reference to FIG. 1. The first ligand 12 includes at least three parts; a first aromatic moiety 30, a first carboxylic moiety 32, and a first linking moiety 34 that connects the first aromatic moiety 30 to the first carboxylic moiety 32. In an exemplary embodiment, the first aromatic moiety 30 includes a benzene ring, and includes zero, one, or more hydroxyl groups, ether groups, naphthalene groups (not illustrated), or other functional groups, where the hydroxyl groups, ether groups, and/or other functional groups are connected at the number 3, 4, and/or 5 carbons of the benzene ring structure (where the first linking moiety 34 is connected to the number 1 carbon of the benzene ring structure.) In alternate embodiments, the hydroxyl, ether, and/or other functional groups are connected to the number 2 and/or number 6 carbon of the benzene ring structure. In an exemplary embodiment, the ether group includes an alkyl group, such as a methyl ether group, an ethyl ether group, or a propyl ether group, but the ether group may include larger alkyl groups as well. The naphthalene group is a double benzene ring structure, which is a polycyclic aromatic compound, where the first linking moiety 34 is connected to at least one of the carbon atoms in the double benzene ring structure.

The first carboxylic moiety 32 includes a carbonyl carbon and two oxygen atoms. The first carboxylic moiety 32 may be linked to the lanthanoid metal 16 or another metal in some embodiments, where the lanthanoid metal 16 or other metal may be present in an ionic form. In general, the first carboxylic moiety 32 may be present as a carboxylic acid, a salt, or in an ionic form in various embodiments.

The first linking moiety 34 is an alkene in an exemplary embodiment, where the first linking moiety 34 is covalently connected to the carbonyl carbon of the first carboxylic moiety 32 and also covalently connected to a carbon atom of a benzene ring of the first aromatic moiety 30. In an embodiment, the first linking moiety 34 includes at least one double bond between carbon atoms (i.e., an alkene) and the first linking moiety 34 includes no triple bonds. Single bonds covalently connect the first linking moiety 34 to the carbonyl carbon of the first carboxylic moiety 32 and to a carbon atom in a benzene ring of the first aromatic moiety 30. In some embodiments, the first ligand is conjugated with alternating single and double bonds, where a double bond between an oxygen atom and the carbonyl carbon of the first carboxylic moiety 32 is separated from a double bond in the first linking moiety 34 by one single bond, and a double bond of the first linking moiety 34 is separated from a benzene ring structure of the first aromatic moiety 30 by one single bond. In an exemplary embodiment, the first linking moiety 34 includes a total of two carbon atoms that are connected by a double bond, but in alternate embodiments the first linking moiety 34 includes more than one double bond and every double bond of the first linking moiety 34 is separated from the next double bond of the first linking moiety 34 by one single bond to maintain conjugation. However, in alternate embodiments, the first linking moiety 34 does not form a conjugated structure from the first carboxylic moiety 32 through the first aromatic moiety 30. In an exemplary embodiment, the first ligand 12 is selected from ferulate, coumarate, and a combination thereof, but in alternate embodiments other first ligands 12 are utilized.

Figure 3:
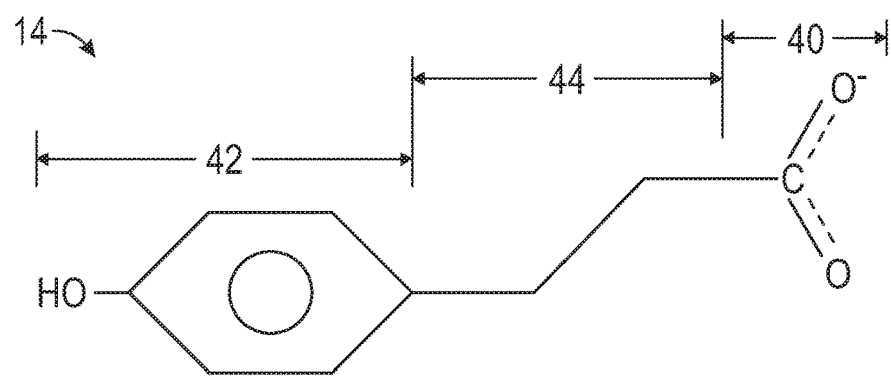

The second ligand 14 has a different structure than the first ligand 12, as illustrated in FIG. 3 with continuing reference to FIGS. 1 and 2. Therefore, the coating 10 has at least two different ligand structures. The second ligand 14 includes a second carboxylic moiety 40, where the second carboxylic moiety 40 can be present in several different forms. For example, the second carboxylic moiety 40 is bonded to a lanthanoid metal 16 or another metal in some embodiments, but the second carboxylic moiety 40 is also present as a carboxylic acid, a salt, or in an ionic form in alternate embodiments. The second ligand 14 includes a second aromatic moiety 42 and a second linking moiety 44 in some embodiments, but in other embodiments the second ligand 14 does not include a second aromatic moiety 42 and may not include a second linking moiety 44. For example, the second ligand 14 is acrylic acid or a derivative thereof in some embodiments, and may be acetic acid or a derivative thereof in other embodiments. In some embodiments, the structure of the second ligand 14 fits within the description of the structure for the first ligand 12, with the exception that the second ligand 14 has a different chemical structure from the first ligand 12. However, in other embodiments the second linking moiety 44 is an alkane with no double or triple bonds, and in other embodiments the second linking moiety 44 is an alkyne with at least one triple bond. In an exemplary embodiment, the second ligand 14 is phenylpropiolate, but in alternate embodiments other second ligands 14 are utilized.

The lanthanoid metal 16 is a metal selected from the lanthanoid series, including any metals having an atomic number of from 57 to 71, or from lanthanum to lutetium in the periodic table. In an exemplary embodiment, the lanthanoid metal 16 is selected from lanthanum and cerium, but other lanthanoid metals are used in alternate embodiments. The lanthanoid metal 16 is present in the ionic form in many embodiments. In some embodiments, the first and second ligands 12, 14 are present in the coating 10 in excess compared to the lanthanoid metal 16, so at least some of the first and second ligands 12, 14 are not bonded or connected to the lanthanoid metal 16.

Tests were conducted on several different first and second ligands 12, 14, and the results indicate the combination of at least two different ligands with a lanthanoid metal 16 in a single mixture produce superior corrosion inhibition than the additive combination of each single different ligand with the lanthanoid metal 16, so the two different ligands have a synergistic corrosion inhibition effect. Not all ligands perform the same, and the structure described above for the first and second ligands 12, 14 provide synergistic effects, as listed below in the EXAMPLES section.

Figure 4:
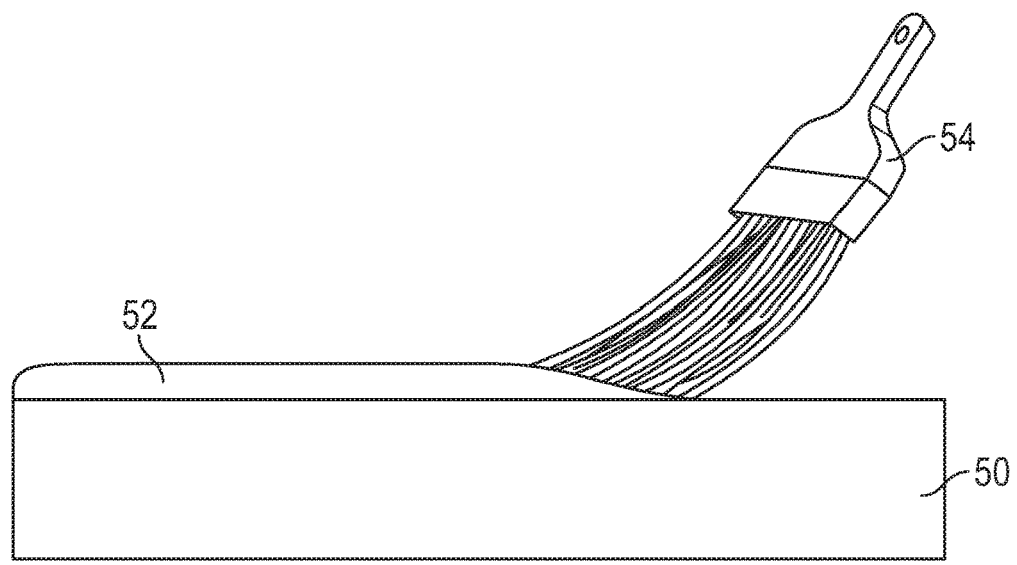
FIGS. 4-6 are representative processes of embodiments of coating an article.

In an exemplary embodiment, the coating 10 includes a coating resin 18 that adheres and forms a coating layer 52 on the article 50, as illustrated in FIG. 4 with continuing reference to FIG. 1. Different coating resins 18 are used in various embodiments, where some coating resins 18 perform better than others. In an exemplary embodiment, the coating resin 18 includes an epoxy base, such as a difunctional bisphenol A/epichlorohydrin reaction product. A curing agent may be included with the epoxy base (typically in a separate package), such as a variety of amines including aliphatic amines, cycloaliphatic amines, polyamides, amidoamines, aromatic amines, etc. In an exemplary embodiment, butylated urea resins are used for the curing agent. In another embodiment, the coating resin 18 is a mixture of two different polyester resins. The first polyester resin is a slightly branched, hydroxyl bearing polyester and the second polyester resin is a saturated polyester resin. An isocyanate hardener may be added to the mixture of polyester resins in a two-pack coating for activation shortly before application. Other types of coating resins 18 are used in different embodiments.

The lanthanoid metal 16 forms a salt complex with the first and second ligands 12, 14 in some embodiments. The lanthanoid metal salt complex may be present in the coating at a concentration of from about 3 to about 40 weight percent in an exemplary embodiment, based on a total solids weight of the coating 10. The total solids weight is the weight of coating after the solvents and other volatile compounds have evaporated. In alternate embodiments, the lanthanoid metal salt complex is present at from about 5 to about 30 weight percent, or from about 10 to about 25 weight percent, or from about 12 to about 20 weight percent, all based on a total solids weight of the coating 10. In an exemplary embodiment, a lanthanoid metal salt complex with the first and/or second ligands 12, 14 at about 5 weight percent or greater, based on the total solids of the coating 10, may improve a synergistic anti-corrosion effect from the different first and second ligands 12, 14.

The coating 10 optionally includes zero, one, or more different types of additives 22 in various embodiments. Exemplary additives include wetting agents, dispersing agents, pigments, fillers, surfactants, antisettling agents, etc. One or more solvents 20 are also included in the coating 10, such as water, water soluble solvents, or water insoluble organic solvents in various embodiments. Possible examples of suitable solvents include water, toluene, xylene, butyl oxitol, methyl isobutyl ketone, cellulose acetate butyrate, methyl amyl ketone, acetone, etc.

Figure 5:
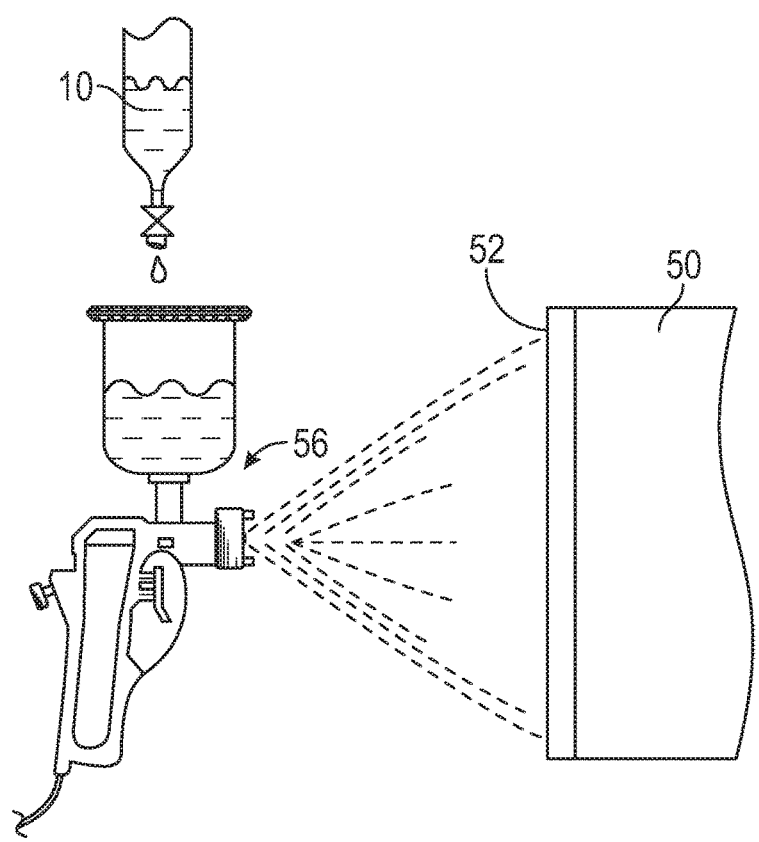
Figure 6:
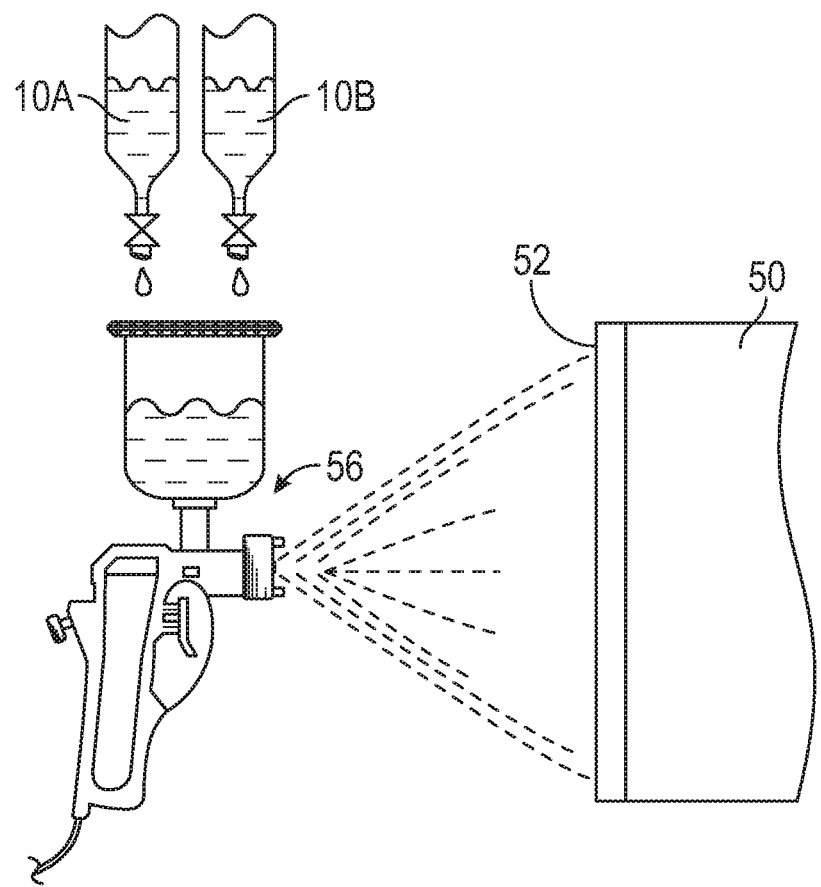

The coating 10, with the first and second ligands 12, 14 the lanthanoid metal 16, the coating resin 18, optional additives 22, and the solvent 20, is applied to the article 50 in the coating layer 52. The coating layer 52 is applied with a brush 54, a spray gun 56, with a doctor blade, by dipping, or by other techniques in various embodiments, as illustrated in some embodiments in FIGS. 4-6 with continuing reference to FIG. 1. One or more coating layers 52 are applied in different embodiments, where the coating layers 52 may or may not be cured between successive applications. The coating layer 52 is cured at least after the final application. The coating layer 52 may be applied in a two pack system, as illustrated in FIG. 6 where the two different packs of the coating 10 are labeled as coating part A 10A and coating part B 10B, or in a one pack system, as illustrated in FIG. 5, or in a three or more pack systems in various embodiments.

The first and second ligands 12, 14 in combination with the lanthanoid metal 16 provide improved corrosion inhibition for the coating 10. The use of two different ligand structures produces a synergistic effect that is more than the sum of the parts. Several different ligand and ligand mixtures were tested for corrosion, as detailed below.

EXPERIMENTAL

Coumarates (Coum), 3-hydroxyphenyl-cinnamates (3HOCinn) and 3-(4-hydroxylphenyl) propionate (4hpp) were used for validation of a rapid corrosion testing method by comparing the efficiencies with literature reported values, and for the elucidation of their performance in mixtures with other carboxylates. The carboxylate testing described in this experimental section is for the use of carboxylates as a ligand when combined with lanthanum and/or cerium, even though the use of lanthanum and/or cerium is not always explicitly mentioned. Additional substrates tested were ferulates (Fer) and alkyne analogs of cinnamate (Cinn) and Coum-3-phenylpropiolate (pp) and 3-(4-hydroxyphenyl) propiolate (HOpp) featuring unsaturated linking moieties between the hydrophilic (carboxylic moiety) and hydrophobic (aromatic moiety) parts of the carboxylate ligand. Moreover, 1-naphthoate (1-Naph), benzoate (Benz) and acetate (Ac) were included in the present study as additional carboxylate ligands.

It was found that the in situ generation of lanthanide carboxylates upon mixing $LnCl_3$, three equivalents of the appropriate carboxylic acid (ligand) and an equimolar amount of the non-coordinating base, $Et_3N$, was a convenient alternative for high-throughput screening compared to isolation, purification and re-dissolving of crystalline lanthanide carboxylates. The solutions of lanthanum and cerium coumarate ($C(Ln^{3+})$=100 ppm, $C_{salt}$=500 ppm) demonstrated corrosion mitigation efficiencies (91±2% and 89±2%, respectively) consistent with those reported in the literature at the same concentration of lanthanide ions (91% and 93%, respectively). For 4hpp, a poor corrosion mitigation performance was observed that is also in agreement with the reported data.

The lanthanide salts of di-substituted cinnamic acid, 3-(OMe)-4-(OH)—$C_6H_3$—CH=CH—COOH or Fer, exhibited the best performance in a series of selected inhibitors that were tested (efficiencies are 93±2% for $LaFer_3$ and 92±1% for $CeFer_3$). In contrast, lanthanide salts of 3,4-dihydroxycinnamates (caffeates) promoted corrosion. Not to be bound by theory, but corrosion may have been enhanced in the presence of caffenoate because of the formation of soluble iron catecholates. This observation suggests an impact and molecular basis of even minor structural changes within the carboxylate frameworks on their corrosion mitigation activity.

The alkyne analogs of cinnamate and coumarate, pp and HOpp, were found to be less efficient for metal passivation at the concentration of lanthanide ions of $C(Ln^{3+})$=100 ppm compared to coumarates. As expected, lanthanide carboxylates missing some structural subunits (i.e., 1-Naph, Benz and Ac) did not demonstrate effective mitigation properties.

Synergistic Effects for Mixtures of Carboxylates.

The high throughput technique allowed the screening of several substrates and their combinations. A high-throughput screening technique for the estimation of corrosion rates and efficiencies of the mixtures of two types of carboxylates in weight/weight ratios of 0:3, 1:2, 2:1 and 3:0 was used. These experiments allowed the estimation of synergistic effects for the mixtures of various carboxylate ligands. Interestingly, the performance of one selected ligand inhibitor, $LaFer_3$, was substantially improved upon the addition of poor inhibitors such as Ac or Benz: the corresponding corrosion rates were significantly decreased compared to lanthanum ferulate (0.09 vs. 0.15 mils/year). Coum and 3HOCinn, when combined with lanthanum and/or cerium, also demonstrated promising passivation synergy when mixed together with Fer. Coumarate (with lanthanum and/or cerium) mixtures with pp exhibited better passivation properties compared to the solution of single carboxylates. It should be also noted that the anti-corrosion properties of 1-Naph or 4hpp were also significantly improved upon their mixing with Coum (2:1) (again, with lanthanum and/or cerium). Not to be bound by theory, but the application of two types of carboxylate ligands may have resulted in the formation of more uniform and denser hydrophobic passivating layers at the metal surfaces due to the steric complementarity of ligands. This compact packing may provide a significant barrier to oxygen ($O_2$) diffusion to a metal surface and to electrochemical processes.

The mixing of pp and Ac ligands reduces the corrosion rates up to twice but the resulting values are still much higher than those observed for Fer or Coum (when combined with lanthanum and/or cerium). Notably, the mixtures of some carboxylates, such as 3HOCinn/Benz, HOpp/4hpp, Ac/4hpp etc. (when combined with lanthanum and/or cerium) actually promoted corrosion processes.

Weight-Loss Measurement at Scale.

To further demonstrate and substantiate the synergistic effects for carboxylate mixtures, corrosion testing for the carboxylate Fer-Ac, Fer-Benz and Coum-pp (when combined with lanthanum and/or cerium) and mixtures were performed using gravimetrical analysis for macro steel coupons. Solutions for corrosion testing were prepared by dissolving solid $LnCarb_3$ in 0.01 M NaCl. In addition to gravimetrical estimation of corrosion parameters, where the corrosion rates and efficiencies are estimated by weighing a metal coupon before and after testing in accordance with ASTM G1 (mass of iron lost), another method was developed and adopted for more accurate and more precise measurement of the mass of iron lost. Both methods, gravimetrical and spectrophotometrical, can be used simultaneously for each corrosion testing trial. The visual examination of the solutions after 7 days of a metal coupon immersion clearly demonstrated less corrosion products formed in the mixtures of carboxylates compared to the solution of single components. Both testing methods showed significantly lower corrosion rates for the mixtures of carboxylates, compared to a single carboxylate ligand, confirming the data obtained by the high-throughput method used for in situ generated lanthanum carboxylates. Notably, the corrosion rates of steel coupons immersed into the solutions of cinnamate-based inhibitors, Fer and Coum, and their mixtures with Ac and pp are much lower compared to comparable 2000 part per million (ppm) chromate solutions ($Na_2Cr_2O_7$).

Three specific ligands were tested in various combinations when in an epoxy-based coating composition. The three specific ligands that were tested were phenylpropiolate (pp), coumarate (coum), and ferulate (fer). Corrosion rates were tested using ASTM test method B117, and Society of Automotive Engineers (SAE) test method J2334. In both cases, the results are reported as millimeters (mm) of scribe creep, where lower values represent less corrosion. The table below lists test results.

Corrosion Test Results in Epoxy-Based Coatings

| Sample | Corrosion test result, in mm of scribe creep | Test method | Comments |
|---|---|---|---|
| epoxy primer with strontium chromate as a corrosion inhibitor | 31.49 | ASTM B117 | 1,000 hours |
| 15% Ce(pp) | 50.8 | ASTM B117 | 1,000 hours |
| 15% Ce(pp/coum) | 36.5 | ASTM B117 | 1,000 hours |
| 15% Ce(pp/fer) | 35.5 | ASTM B117 | 1,000 hours |
| 15% La(pp) | 25.50 | ASTM B117 | 1,000 hours |
| 15% La(pp)/La(fer) 2/1 | 7.34 | ASTM B117 | 1,000 hours |
| 15% La(pp)/La(coum) 2/1 | 6.45 | ASTM B117 | 1,000 hours |
| Epoxy primer without a corrosion inhibitor | 59.4 | ASTM B117 | 1,000 hours |
| Epoxy primer with zinc aluminum phosphate as a corrosion inhibitor | 11.22 | ASTM B117 | 1,000 hours |
| epoxy primer with strontium chromate as a corrosion inhibitor | 8.95 | SAE J2334 | 40 cycles |
| Epoxy primer with zinc aluminum phosphate as a corrosion inhibitor | 10.16 | SAE J2334 | 40 cycles |
| Epoxy primer without a corrosion inhibitor | 8.82 | SAE J2334 | 40 cycles |
| 15% Ce(pp) | 7.13 | SAE J2334 | 40 cycles |
| 15% ce(pp)/Ce(coum) 2/1 | 5.89 | SAE J2334 | 40 cycles |
| 15% Ce(pp)/Ce(fer) 2/1 | 5.65 | SAE J2334 | 40 cycles |
| 5% Ce(pp) | 4.41 | SAE J2334 | 40 cycles |
| 5% Ce(pp/Cd(fer) 2/1 | 6.91 | SAE J2334 | 40 cycles |
| 5% Ce/Ce(coum) 2/1 | 5.08 | SAE J2334 | 40 cycles |
| 15% La(pp) | 6.02 | SAE J2334 | 40 cycles |
| 15% La(pp)/La(coum) 2/1 | 5.99 | SAE J2334 | 40 cycles |
| 15% La(pp)/La(fer) 2/1 | 5.15 | SAE J2334 | 40 cycles |
| 5% La(pp) | 6.02 | SAE J2334 | 40 cycles |
| 5% La(pp) | 5.15 | SAE J2334 | 40 cycles |
| 5% La(pp)/La(fer) 2/1 | 6.06 | SAE J2334 | 40 cycles |
| Primer, no anti-corrosive pigment | 5.44 | SAE J2334 | 40 cycles, Phenalkamine crosslinker |
| 5% La(pp) | 5.26 | SAE J2334 | 40 cycles, Phenalkamine crosslinker |
| 5% La(pp)/La(coum) 2/1 | 4.62 | SAE J2334 | 40 cycles, Phenalkamine crosslinker |
| Primer, no anti-corrosive pigment | 8.09 | SAE J2334 | 40 cycles, Ketimine crosslinker |
| 5% Ce(pp) | 7.08 | SAE J2334 | 40 cycles, Ketimine crosslinker |
| 5% Ce(pp)/Ce(fer) 2/1 | 7.89 | SAE J2334 | 40 cycles, Ketimine crosslinker |
| 3% Ce(pp)/Ce(fer) 2/1 | 7.61 | SAE J2334 | 40 cycles, Ketimine crosslinker |
| 5% La(pp) | 6.38 | SAE J2334 | 40 cycles, Ketimine crosslinker |
| 5% La(pp)/La(fer) 2/1 | 7.85 | SAE J2334 | 40 cycles, Ketimine crosslinker |

(1) Ligand concentration reported in volume percent lanthanoid metal/ligand salt complex, based on total solids in the coating.
(2) Some results at 3% and 5% not reported
(3) Ce represents cerium, and La represents lanthanum.
(4) 2/1 indicates the mole/mole ratio of the ligands, so 2/1 indicates first listed ligand is present at twice the number of moles as the second listed ligand As can be seen, the samples with two different ligands outperform the samples with one single ligand in several cases, especially when the total concentration of ligand was about 15 weight percent, based on total solids within the coating. This demonstrates a synergistic anti-corrosion effect when two different ligands are used, as compared to when a single ligand is used.

Theoretical coating formulations that incorporate the first and second ligands 12, 14 and the lanthanoid metal 16 where prepared and are described below. These coating formulations were not actually tested, but are expected to produce favorable corrosion inhibition results.

Prophetic Example 1—Preparation of an Epoxy Primer Containing Lanthanide Complex Corrosion Inhibitors To prepare about one gallon of Part A epoxy base, combine about 1434 grams of epoxy resin (Egon® Resin 828, acquired from Hexion), about 16 grams of n-butylated urea resin (Beetle™ U 216-8, acquired from Cytec Industries), about 27 grams of wetting and dispersing additive (Anti-Terra® U, acquired from BYK-Chemie), about 409 grams of toluene (acquired from Shell Chemicals), about 525 grams of xylene (acquired from Shell Chemicals), about 111 grams of Butyl OXITOL™ Glycol Ether, acquired from Shell Chemicals), about 56 grams of Bentone SD-2 thixotrope (acquired from Elementis Specialties), about 657 grams of red iron oxide (RO-4097 Kroma® Red Iron Oxide, acquired from Huntsman), about 546 grams of cerium tri-coumarate, about 273 grams of cerium tri-phenylpropiolate, about 1862 grams of barium sulfate (Sparmite Barium Sulfate, acquired from Huntsman), about 656 grams of talc (399 Lo-Micron Magnesium Silicate, Whittaker, acquired from Clark & Daniels, Inc.), and about 428 grams of mica (Water Ground Mica, 325 Mesh, acquired from Franklin Minerals Inc.). After pre-dispersing this mixture on a Cowles disperser, it is dispersed further in a media mill (0.8-2.0 mm glass beads) to a Hegman 5 to 6. For activation and film preparation, combine about 90 parts by weight of Part A epoxy base described above with about 10 parts by weight of Part B, consisting of modified polyamide hardener (EPIKURE® 3175 Curing Agent, acquired from Hexion). Allow to cure at ambient temperature for about 7 to 10 days before evaluation.

Prophetic Example 2—Preparation of a Polyurethane Primer Containing Lanthanide Complex Corrosion Inhibitors To prepare about one gallon of Part A pigmented polyol base, combine about 970 grams of polyester resin (Desmophen® 670 A-80, acquired from Covestro), about 129 grams of a second polyester resin (Desmophen® 631 A-75, acquired from Covestro), about 6 grams of wetting and dispersing additive (Anti-Terra® 204, acquired from Byk USA), about 12 grams of surface additive (Byk® 320, acquired from Byk USA), about 12 grams of antisettling agent (M-P-A® 1078X, acquired from Elementis Specialties), about 666 grams of titanium dioxide (Ti-Pure® R-960, acquired from Chemours), about 224 grams of cerium tri-coumarate, about 112 grams of cerium tri-phenylpropiolate, about 671 grams of silica (Imsil® A-8, acquired from Unimin Corporation), about 578 grams of barium sulfate (Sparmite Barium Sulfate, acquired from Huntsman), about 557 grams of talc (Micron® 503, acquired from Imerys), about 25 grams of cellulose acetate butyrate (CAB-551-0.01, acquired from Eastman Chemical Company), about 89 grams of methyl isobutyl ketone (acquired from Eastman Chemical Company), and about 310 grams of p-chlorobenzotrifluoride (Oxsol® 100, acquired from Univar), about 433 grams of methyl amyl ketone (acquired from Eastman Chemical Company), about 598 grams of acetone acquired from (Eastman Chemical Company), and about 212 grams of water scavenger (Zoldine® RD-20, acquired from Angus Chemical Company). After pre-dispersing this mixture on a Cowles disperser, it is dispersed further in a media mill (0.8-2.0 mm glass beads) to a Hegman 5+. Stir-in about 0.6 grams of amine catalyst (Dabco® T-12, acquired from Air Products and Chemicals) to the finished dispersion to give the completed Part A. For activation and film preparation, combine about 89.9 parts by weight of Part A pigmented polyol base described above with about 10.1 parts by weight of Part B, consisting of isocyanate hardener (Desmodur® N-3300, acquired from Covestro). Allow to cure at ambient temperature for about 7 to 10 days before evaluation.

While at least one exemplary embodiment has been presented in the foregoing detailed description, it should be appreciated that a vast number of variations exist. It should also be appreciated that the exemplary embodiments are only examples, and are not intended to limit the scope, applicability, or configuration of the application in any way. Rather, the foregoing detailed description will provide those skilled in the art with a convenient road map for implementing one or more embodiments, it being understood that various changes may be made in the function and arrangement of elements described in an exemplary embodiment without departing from the scope, as set forth in the appended claims.

What is claimed is:

1. A coating comprising:
   a first ligand, wherein the first ligand comprises a first carboxylic moiety, a first aromatic moiety, and a first linking moiety connecting the first carboxylic moiety to the first aromatic moiety, wherein the first linking moiety comprises an alkene;
   a second ligand different than the first ligand, wherein the second ligand comprises a second carboxylic moiety;
   a lanthanoid metal; and
   a coating resin.

2. The coating of claim 1 wherein:
   the first aromatic moiety comprises a benzene ring and one or more hydroxyl groups connected to the benzene ring.

3. The coating of claim 2 wherein the one or more hydroxyl groups is connected to the number 3, 4, or 5 carbon of the benzene ring, and wherein the first linking moiety is connected to the number 1 carbon of the benzene ring.

4. The coating of claim 1 wherein:
   the first aromatic moiety comprises a benzene ring and one or more ether groups connected to the benzene ring.

5. The coating of claim 4 wherein the one or more ether groups is connected to the number 3, 4, or 5 carbon of the benzene ring, and wherein the first linking moiety is connected to the number 1 carbon of the benzene ring.

6. The coating of claim 1 wherein the first carboxylic moiety comprises a carbonyl carbon and two oxygen atoms.

7. The coating of claim 1 wherein a lanthanoid metal/ligand salt is present in the coating at from about 10 to about 25 weight percent, based on a total solids weight of the coating.

8. The coating of claim 1 wherein the first linking moiety comprises a total of two carbon atoms that are connected by a double bond.

9. The coating of claim 1 wherein the first ligand is conjugated, where a double bond between an oxygen atom and a carbonyl carbon of the first carboxylic moiety is separated from a double bond in the first linking moiety by one single bond, and wherein the double bond of the first linking moiety is separated from a benzene ring structure of the first aromatic moiety by one single bond.

10. The coating of claim 1 wherein the first linking moiety comprises more than one double bond, and wherein every double bond of the first linking moiety is separated from every other double bond of the first linking moiety by at least a single bond.

11. The coating of claim 1 wherein the second ligand further comprises a second aromatic moiety.

12. The coating of claim 11 wherein the second ligand further comprises a second linking moiety, wherein the second linking moiety is connected to the second aromatic moiety and the second linking moiety is connected to the second carboxylic moiety.

13. The coating of claim 12 wherein the second linking moiety is an alkyne.

14. The coating of claim 1 wherein the first ligand is selected from ferulate, coumarate, or a combination thereof.

15. The coating of claim 14 wherein the second ligand is phenylpropiolate.

16. The coating of claim 1 wherein the lanthanoid metal is lanthanum.

17. The coating of claim 1 wherein the lanthanoid metal is cerium.

18. The coating of claim 1 wherein the lanthanoid metal is selected from lanthanum, cerium, or a combination thereof.

19. A method of producing a coating comprising:
   combining components, where the components comprise;
   (a) a first ligand, wherein the first ligand comprises a first carboxylic moiety, a first aromatic moiety, and a first linking moiety connecting the first carboxylic moiety to the first aromatic moiety, wherein the first linking moiety comprises an alkene;

(b) a second ligand different than the first ligand, wherein the second ligand comprises a second carboxylic moiety;

(c) a lanthanoid metal; and (d) a coating resin; and mixing the components to produce the coating.

20. A method of using a coating comprising:

applying a coating over an article, wherein the coating comprises a first ligand, a second ligand different than the first ligand, a lanthanoid metal, and a coating resin, wherein the first ligand comprises a first carboxylic moiety, a first aromatic moiety, and a first linking moiety connecting the first carboxylic moiety to the first aromatic moiety, wherein the first linking moiety comprises an alkene, and wherein the second ligand comprises a second carboxylic moiety; and curing the coating.

* * * * *